United States Patent
Torsner et al.

(10) Patent No.: US 9,356,739 B2
(45) Date of Patent: *May 31, 2016

(54) METHOD AND SYSTEM FOR PROVIDING AUTONOMOUS RETRANSMISSIONS IN A WIRELESS COMMUNICATION SYSTEM

(71) Applicant: TELEFONAKTIEBOLAGET L M ERICSSON (PUBL), Stockholm (SE)

(72) Inventors: Johan Torsner, Kyrkslätt (FI); Janne Peisa, Espoo (FI); Maria Edvardsson, Järfälla (SE); Christer Edholm, Täby (SE); Erik Dahlman, Stockholm (SE); Stefan Parkvall, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,875

(22) Filed: Feb. 17, 2014

(65) Prior Publication Data

US 2014/0226580 A1    Aug. 14, 2014

Related U.S. Application Data

(63) Continuation of application No. 11/568,595, filed as application No. PCT/SE2004/000719 on May 10, 2004, now Pat. No. 8,705,431.

(51) Int. Cl.
*H04L 1/18* (2006.01)
*H04L 1/16* (2006.01)
(Continued)

(52) U.S. Cl.
CPC ............ *H04L 1/1812* (2013.01); *H04L 1/1664* (2013.01); *H04L 1/189* (2013.01); *H04L 5/0055* (2013.01); *H04L 1/0007* (2013.01)

(58) Field of Classification Search
CPC .............. H04W 72/04; H04W 72/042; H04W 72/0413; H04W 72/1278; H04W 74/004; H04W 72/0446; H04L 1/0026
See application file for complete search history.

(56) References Cited

U.S. PATENT DOCUMENTS 6,678,523 B1 *   1/2004   Ghosh et al. .................. 455/442
6,693,907 B1     2/2004   Wesley et al.
(Continued)

FOREIGN PATENT DOCUMENTS

EP    1 357 695 A1   10/2003
JP    2228853 A       9/1990
(Continued)

OTHER PUBLICATIONS

Kusudo T. et al. "A Selective Repeat Request with Continuous Multiple Transmissions for a Message." Electronics and Communications in Japan, Part 1—Communications, Wiley, Hoboken NJ, US. vol. 84, No. 6, Jun. 1, 2001. pp. 68-76.
(Continued)

*Primary Examiner* — Charles Appiah
*Assistant Examiner* — Edward Zhang

(57) ABSTRACT

A transmitter that may have marginal power availability is enabled to autonomously retransmit previously transmitted frames containing the same data. The transmitter sends an initial frame to a base transceiver station (BTS) and immediately retransmits the same frame without regard to any ACK/NAK transmission from the BTS. The retransmissions are accumulated in the receiver and decoded after a sufficient quantity of the frame is transmitted. After receiving the last retransmitted frame the BTS sends an ACK/NAK to the transmitter that is accepted.

27 Claims, 6 Drawing Sheets

(51) Int. Cl.
*H04L 5/00* (2006.01)
*H04L 1/00* (2006.01)

(56) References Cited

U.S. PATENT DOCUMENTS

| | | |
|---|---|---|
| 7,002,923 B2 | 2/2006 | Golitschek |
| 7,339,949 B2 | 3/2008 | Suzuki |
| 2002/0159410 A1 | 10/2002 | Odenwalder et al. |
| 2002/0172192 A1* | 11/2002 | Hunzinger et al. ........... 370/352 |
| 2002/0172208 A1 | 11/2002 | Malkamaki |
| 2003/0039218 A1 | 2/2003 | Kwak |
| 2003/0078010 A1* | 4/2003 | Davis .............................. 455/69 |
| 2003/0081692 A1 | 5/2003 | Kwan et al. |
| 2003/0134590 A1* | 7/2003 | Suda et al. ................... 455/3.06 |
| 2003/0174662 A1 | 9/2003 | Malkamaki |
| 2003/0185175 A1 | 10/2003 | Golitscheck et al. |
| 2003/0210662 A1 | 11/2003 | Rensberger et al. |
| 2003/0210669 A1 | 11/2003 | Vayanos |
| 2004/0037224 A1* | 2/2004 | Choi et al. .................... 370/235 |
| 2004/0042492 A1 | 3/2004 | Suzuki et al. |
| 2004/0137896 A1* | 7/2004 | Sarkar et al. .................. 455/423 |
| 2004/0223507 A1 | 11/2004 | Kuchibhotla et al. |
| 2006/0168343 A1 | 7/2006 | Ma et al. |

FOREIGN PATENT DOCUMENTS

| | | |
|---|---|---|
| WO | WO 98/37660 | 8/1998 |
| WO | WO 00/62467 A1 | 10/2000 |
| WO | WO 01/37493 A1 | 5/2001 |
| WO | WO 03/047155 A1 | 6/2003 |

OTHER PUBLICATIONS

LG Electronics. "Node B Scheduling of HARQ Retransmission." 3GPP (Online) Jan. 20, 2004.

* cited by examiner

METHOD AND SYSTEM FOR PROVIDING AUTONOMOUS RETRANSMISSIONS IN A WIRELESS COMMUNICATION SYSTEM

RELATED APPLICATIONS

This application is a continuation of co-pending U.S. patent application Ser. No. 11/568,595 filed Nov. 2, 2006, which is a 371 of International Application No. PCT/SE2004/000719, filed May 10, 2004 the disclosures of which are fully incorporated herein by reference.

BACKGROUND OF THE INVENTION

1. Technical Field of the Invention

The present invention relates to digital wireless communication systems. More particularly, the present invention relates to Wideband Code Division Multiple Access (WCDMA) communication systems. Even more particularly, the present invention relates to data transmissions between user equipment (UE) and a receiver in a WCDMA system.

2. Description of Related Art

The physical layer in WCDMA offers one or several transport channels to the higher layers. Data from the transport channels are individually coded, multiplexed together, and transmitted over the air to the receiving end. The transmission time interval (TTI) for a transport channel is the duration of data over which coding and interleaving is performed. For Frequency Division Duplex (FDD) mode, this also corresponds to the actual transmission time over the air of the transport blocks in a given TTI. Currently, the WCDMA FDD uplink supports TTIs of 10, 20, 40, or 80 ms, a parameter that is semi-statically configured per transport channel via relatively slow higher layer signaling.

In a packet data transmission scenario, data typically arrives to the physical layer in the form of transport blocks having a fixed size, e.g., 336 bits. This size cannot be easily or rapidly changed and is typically fixed to the same value for all users in a system. One transport block is the smallest non-zero quantity of data that can be transmitted on a transport channel in one TTI, which gives the lowest non-zero data rate that can be supported. For a given transport block size, the longer the TTI, the lower the smallest non-zero data rate is. At the same time, low delays are usually important for packet data systems. Hence, the shorter the TTI, the better, from a delay perspective.

In a wireless communication system, the higher the data rate, the larger the received power has to be to maintain a suitable received energy per information bit. Thus, there is a maximum terminal-to-base-station distance where a certain data rate can be reliably supported. At this distance, the terminal is transmitting at maximum power to overcome the propagation loss from the terminal to the base station and still maintain the minimum required received power for reliable communication at the data rate considered. Thus, the further from the base station the terminal is, the lower the maximum data rate possible. Typically, a cellular network is planned for a certain minimum (uplink) bitrate, e.g., 64 kbit/s, by placing the base stations at a suitable distance from each other.

To ensure error-free delivery of received packets to the application layer, (wireless) communication systems typically use hybrid Automatic Repeat Request (ARQ). In a system using hybrid ARQ, data are coded and transmitted to the receiver. The receiver tries to decode the received data and, if errors are found in the received data, the receiver requests a retransmission of the data unit from the transmitter. If no errors are found in the decoding process, the received data unit is considered to be correctly received and the receiver transmits an acknowledgement signal to the transmitter and passes the received data unit to higher layers. Thus, (near) error-free delivery of data units to higher layers can be provided.

The performance of the hybrid ARQ mechanism can be further enhanced by performing soft combining, i.e., the receiver is buffering the erroneously received data unit and combines the buffered soft information with the soft information received due to the retransmission(s).

A simple illustration of the operation of an ARQ protocol is shown in FIG. 1. For illustrative purposes, this figure uses multiple independent stop-and-wait protocols in a similar way as is done for high-speed downlink packet access (HS-DPA).

The transmitter transmits one unit of data in the first frame. Along with the data, control information is transmitted, e.g., hybrid ARQ process number and a new data indicator. Upon reception, the receiver tries to decode the received signal and transmits an ACK or NAK to the transmitter. In FIG. 1, the decoding process failed and a NAK is transmitted in order to request a retransmission from the transmitter. The transmitter retransmits the data, this time with the new data indicator set to indicate that this is a retransmission and the received signal should be soft combined with the already buffered information in order to improve the probability for successful decoding. The idea behind the process number is to be able to utilize multiple parallel stop-and-wait protocols. Thus, while trying to decode the data transmitted in frame 1 and intended for hybrid ARQ process 1, frame 2-4 can be used for transmission to other hybrid ARQ processes, e.g., process 2-4.

In Third Generation Partnership Project (3GPP), there are currently discussions on how to enhance the performance for packet data services in the uplink. One of the major concerns is to reduce the delays. A significant delay reduction is possible if hybrid ARQ with soft combining is introduced and placed in the base station, in which case the base station rapidly can request retransmission of erroneously received data units from the terminal instead of relying on slower, higher layer retransmission protocols. A further delay reduction is possible if the minimum TTI is reduced from 10 ms to 2 ms.

Currently, neither hybrid ARQ (located in the base station), nor 2 ms TTI is supported by the uplink in WCDMA, but the introduction is currently being discussed in 3GPP. The introduction of hybrid ARQ with soft combining is conceptually straightforward. A semi-static TTI of 2 ms can in principle be based on existing structures.

As stated above, the minimum non-zero data rate is higher when the TTI is shorter. Hence, assuming an unchanged maximum terminal transmission power, the coverage for terminals using a new 2 ms TTI may be affected compared to terminals using the existing 10 ms TTI. With the example numbers above, a minimum transport block size of 336 bits, which is the smallest non-zero unit that can be transmitted in the uplink, corresponds to a minimum non-zero data rate of 33.6 kbit/s for 10 ms TTI and 168 kbit/s for a 2 ms TTI. Assuming a network planned for 64 kbit/s coverage, which is a typical value, data transmission at the cell border can be guaranteed for a TTI of 10 ms, but not for a TTI of 2 ms. This is unfortunate as it is not desirable to re-plan the network when a new feature is introduced in the specifications. In addition to the coverage issues, there may also be reasons from a radio resource management (RRM) point of view to be able to use a minimum non-zero data rate significantly lower than 168 kbit/s.

SUMMARY OF THE INVENTION

One solution to the problem above is to switch from a TTI of 2 ms to 10 ms in situations when the terminal is power limited. As the TTI currently is a semi-static parameter, higher-layer signaling is required to reconfigure the terminal in this case, which is a slow process that may not be able to adapt to rapid power limitations occurring in the terminal due to the rapidly varying channel conditions. Furthermore, the network, which is typically not aware of a power situation in the terminal, must initiate the reconfiguration; a situation the terminal cannot inform the network about as the limitation itself may prevent the terminal to reliably communicate with the network. A dynamic TTI, i.e., allowing the terminal to autonomously change the TTI whenever there is a power limitation, could be one solution. However, a dynamic TTI is not in line with the current WCDMA specifications and may be controversial and/or complicated to introduce in the specifications. It can also cause problems with buffer handling at the time of switching the TTI, e.g., how to handle retransmissions of an outstanding packet with 10 ms TTI if the TTI is switched to 2 ms.

Another possibility could be to keep the 2 ms TTI and rely on the hybrid ARQ protocol and soft combining. With this approach, the terminal would transmit data using a 2 ms TTI at the lowest non-zero rate even in a power-limited situation. As the received power is not sufficiently large, the data cannot be reliably detected and a retransmission will almost always be requested from the terminal. When the retransmission occurs, the base station can perform soft combining of the retransmission and the buffered soft information from previous transmission attempts. For each retransmission attempt, the accumulated energy per information bit increases and eventually the base station will be able to successfully decode the data. This solution relies on the hybrid ARQ mechanism; a mechanism that is proposed to be introduced due to other reasons as well. Hence, this approach is simple as it does not require any changes to the TTI configured. However, a drawback is the additional delay from each retransmission attempt; a drawback that is relatively serious as one of the main reasons for introducing the hybrid ARQ mechanism and the 2 ms TTI was to reduce overall delays.

The invention describes several possibilities for realizing a longer transmission interval, e.g., in situations when the minimum non-zero data rate is too high. As the invention is based on hybrid ARQ with soft combining, which is desirable for other reasons as well, it enables the transmitter to autonomously and rapidly use a lower data rate than otherwise possible. The alternative of using higher layer signaling to reconfigure the transmitter/receiver is significantly slower and may lead to inefficient utilization of the available resources. Another alternative, which is to support multiple TTIs (frame lengths) for the channel and let the transmitter autonomously select which TTI to use is possible, although it is believed to be more complex from a specification and (possibly) implementation point of view. Furthermore, the described scheme can easily realize a wide range of transmission intervals without any additional complexity. It also allows the transmitter to perform the initial transmission using multiple autonomous retransmissions (i.e., spanning multiple frames) and an ordinary retransmission (based on the received ACK/NAK) spanning only a single frame.

BRIEF DESCRIPTION OF THE DRAWINGS

The novel features believed characteristic of the invention are set forth in the appended claims. The invention itself however, as well as preferred modes of use, further objects and advantages thereof, will best be understood by reference to the following detailed description of illustrative embodiments when read in conjunction with the accompanying drawings, wherein:

DETAILED DESCRIPTION OF PREFERRED EMBODIMENT

The invention is applicable to the WCDMA enhanced uplink, which is currently under standardization in 3GPP. It may also be applicable to other future standards. In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances detailed descriptions of well-known devices, circuits, and methods are omitted so as not to obscure the description of the present invention with unnecessary detail.

Figure 1:
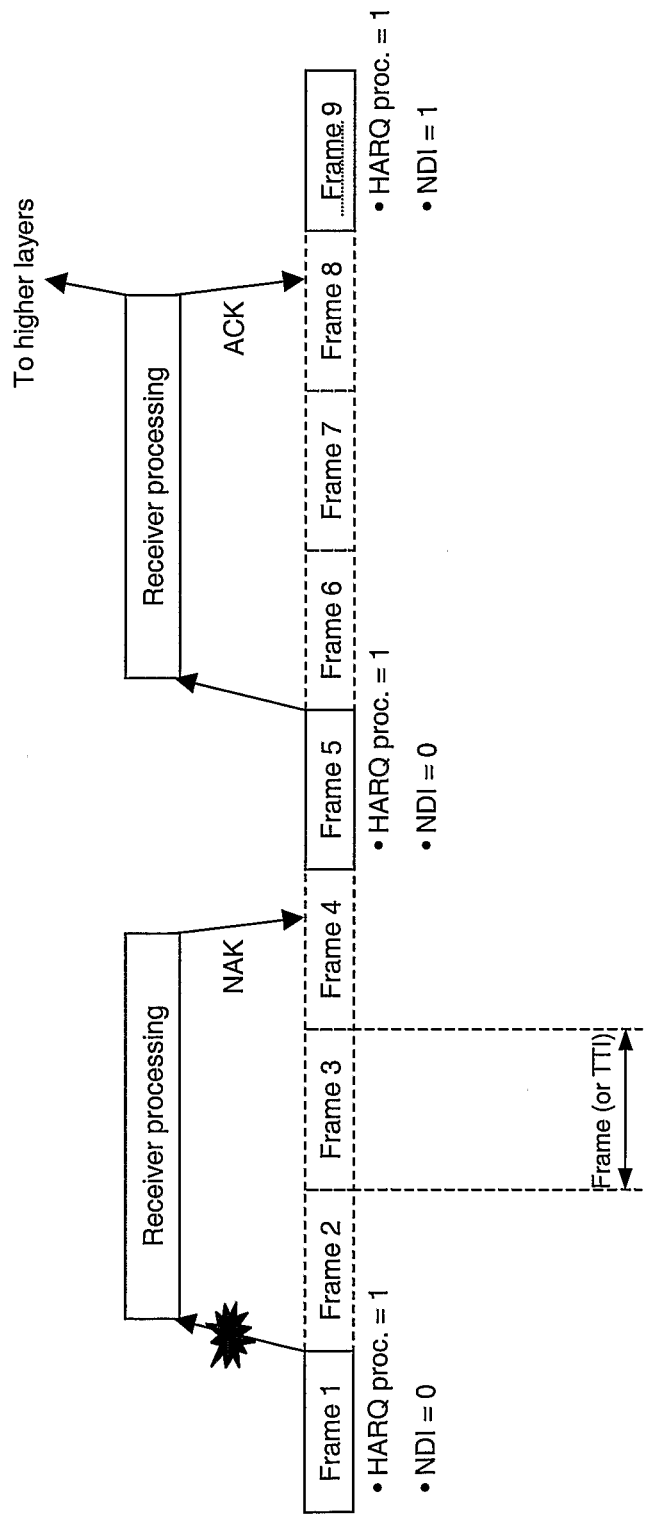
FIG. 1 depicts operation of a conventional hybrid ARQ.
Figure 2:
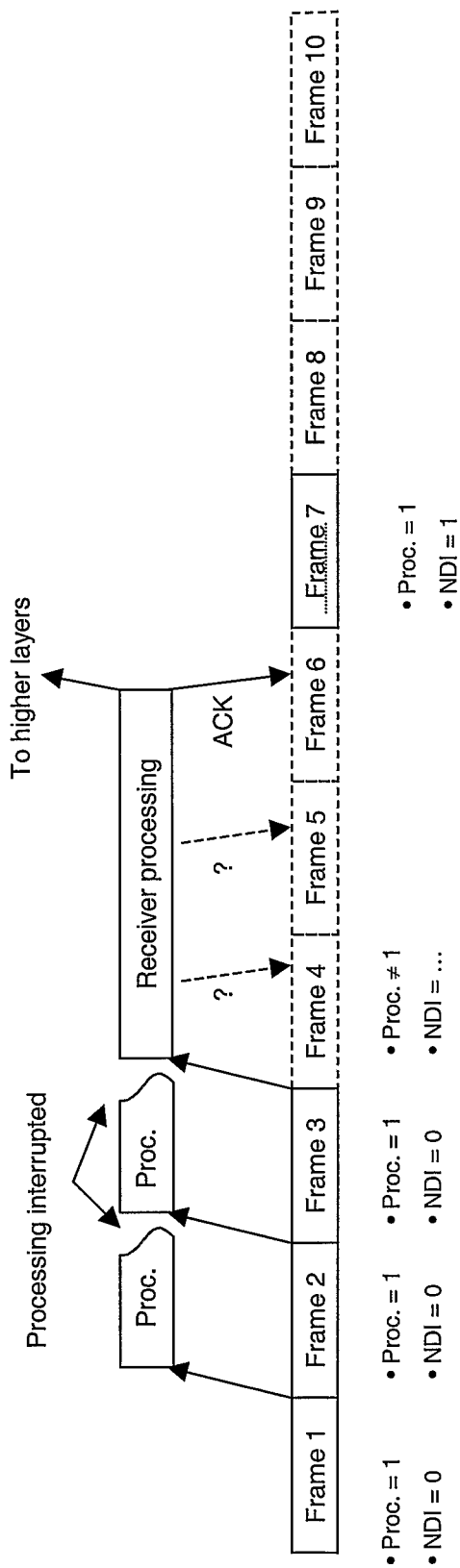
FIG. 2 illustrates "autonomous" retransmissions from a terminal without waiting for the ACK/NAK signal from the network, in accordance with a preferred embodiment of the present invention.

FIG. 2 illustrates autonomous retransmissions from a terminal without waiting for the ACK/NAK signal from the network, in accordance with a preferred embodiment of the present invention. A method for solving the problem of a too high non-zero minimum data rate that relies on the hybrid ARQ functionality is proposed, but without the additional delay associated with waiting for the ACK/NAK feedback from the receiver. The transmitter (user equipment) performs autonomous retransmissions without waiting for the receiver (network equipment) to transmit an ACK/NAK signal and without incurring the delays associated with an ACK/NAK signal. The transmitter transmits one data unit in frame 1 and repeats the data unit in subsequent frames. Note that the data can be retransmitted in any number of frames depending on the implementation of the invention; the use of 3 frames in the figure is strictly an illustrative example.

After receiving the first frame, including a data unit (along with a hybrid ARQ process number), the receiver begins to decode the first frame. In receiving the second frame, which includes a repeat of the data unit, the receiver notes that the transmitter indicates a transmission using the same hybrid ARQ process number as that in the preceding frame, signifying that an "autonomous retransmission" is ongoing. Upon detecting the "autonomous retransmission" in the second frame, the receiver aborts decoding the first frame (unless the decoding already is completed), soft combines the second frame with the first frame and starts decoding the combined signal. Similarly, upon detection of the third autonomous transmission, the receiver aborts the decoding, combines all three signals, and initiates a new decoding attempt. As noted above, using three frames is strictly an illustration for ease of understanding and is not meant to limit the number of frames that may be autonomously transmitted.

A hybrid ARQ process number different from the preceding frames is transmitted with the fourth frame and upon detecting the different process number, the receiver concludes that no additional autonomous transmissions related to the first three frames are expected, so the decoder completes the decoding of the combined data. The outcome of the decoding attempt is indicated to the transmitter through an ACK/NAK (or similar status report) as in any hybrid ARQ scheme.

Figure 3:
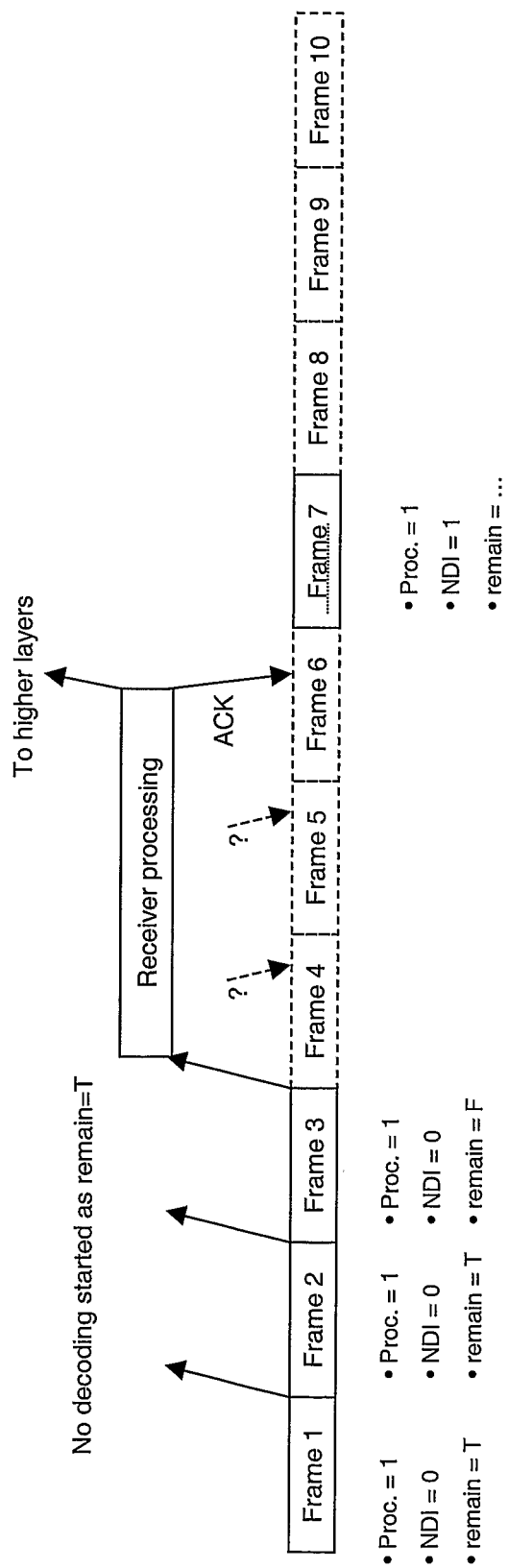
FIG. 3 depicts autonomous retransmissions from a terminal without waiting for the ACK/NAK signal from the network by including a remaining data flag, according to a preferred embodiment of the present invention.

FIG. 3 depicts retransmissions from a terminal wherein each of the retransmissions include a remaining data flag, according to a preferred embodiment of the present invention. Although the method described in the previous paragraph enables the use of autonomous retransmissions, it will unnecessarily start the decoder in the receiver even if the frames are part of an autonomous retransmission. This can be resolved by including a remaining data flag along with the control information required for the operation of a hybrid ARQ scheme, e.g., hybrid ARQ process number and new data indicator. If the remaining data flag is set to 'true', the receiver knows that an autonomous transmission will follow in the next frame and does not have to start the decoder, but only buffer the soft bits for upcoming autonomous transmissions. In the third frame, the 'remaining data' flag is set to 'false', which indicates to the receiver that no autonomous transmissions follows. The receiver can then start the decoder and process the data as in any hybrid ARQ scheme. Thus, the 'remaining data' flag can be seen as a 'do not start the decoder' indicator to the receiver.

Figure 4:
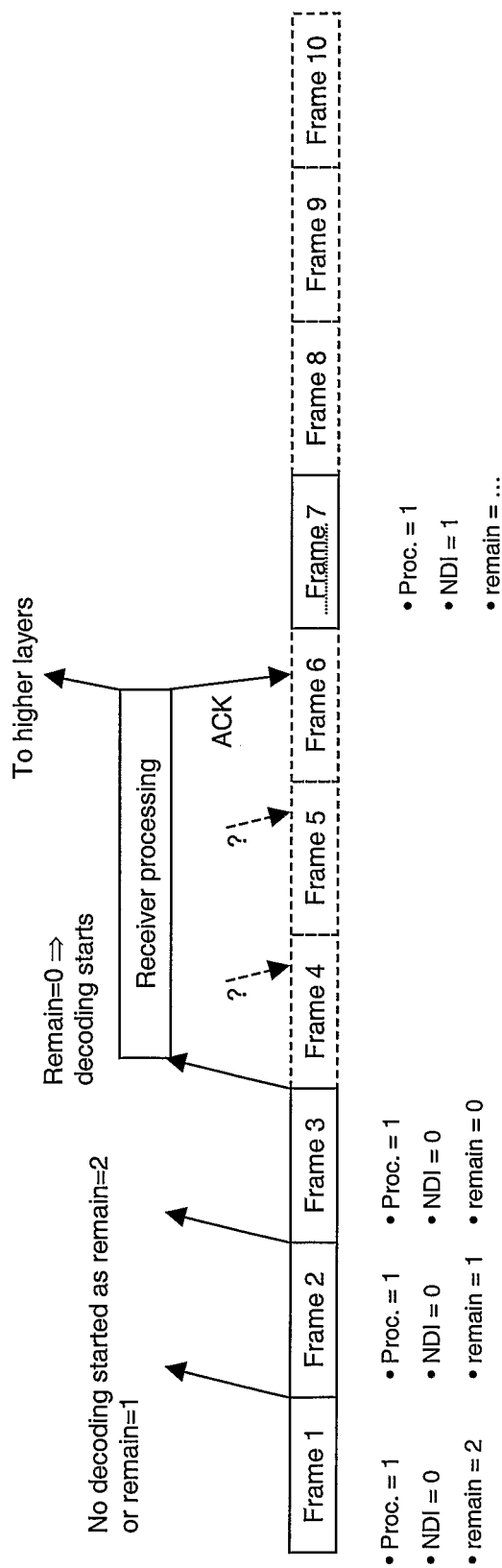
FIG. 4 illustrates autonomous retransmissions from a terminal without waiting for the ACK/NAK signal from the network by including a remaining transmissions field, according to a preferred embodiment of the present invention.

FIG. 4 illustrates a frame structure including a "remaining transmissions" field, according to a preferred embodiment of the present invention. A 'remaining transmission' field may be included in the frames in place of the remaining data flag. The field indicates how many additional autonomous retransmissions to expect. In the first frame, the transmitter indicates that the two following frames will contain autonomous retransmissions and hence should be soft combined with the initial transmission prior to decoding. In the second frame, the 'remaining transmissions' field is set to one to indicate that one additional autonomous retransmission is to follow and, finally, in the third slot, the remaining transmissions field is set to zero as this is the last frame and, after soft combining the three frames the decoder should be started.

The advantage of having a 'remaining transmissions field is better handling of error events. If the second frame, i.e., in FIG. 3, is lost the receiver does not know whether it should start the decoding process after frame 3 or not. In FIG. 4, on the other hand, the remaining data field has indicated to the receiver that the decoding should not start until the end of frame 3 and an additional requirement is that beginning the decoding process is to be based on soft combining frames 1, 2, and 3.

To further increase the robustness against error cases the receiver can transmit a feedback signal (ACK/NAK) for the last autonomous transmission even if the receiver does not detect that particular transmission. This means that it is possible that no retransmission is needed even if, e.g., the last transmitted TTI is not detected. This is only possible if the receiver knows how many autonomous transmissions the transmitter performs.

In the discussions above, it has been assumed that the hybrid ARQ process number and the new data indicator (or similar information) are transmitted along with each data frame. In principle, it is possible to transmit the process number and new data indicator only in the first frame of an autonomous repetition. Some transmission power will be saved with such an approach and could be used for data transmission instead, but the scheme is also more sensitive to error events as it is crucial to receive the first frame.

Figure 5:
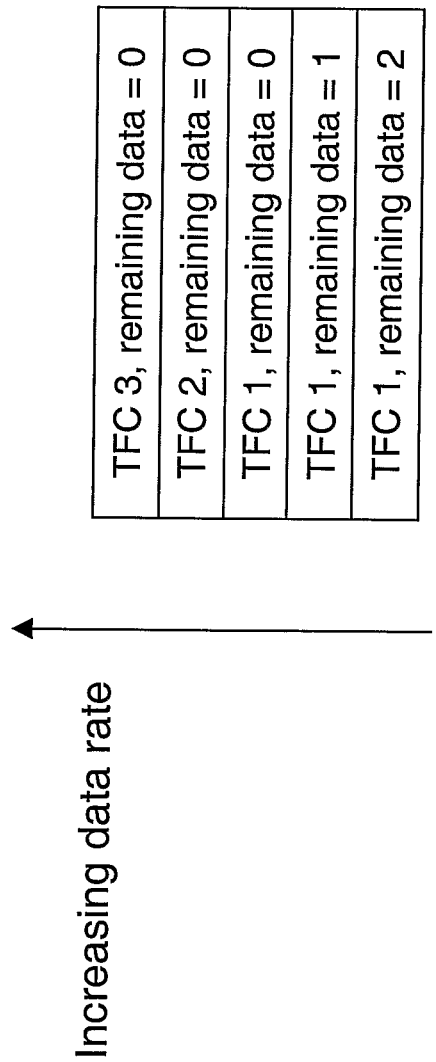
FIG. 5 depicts the remaining data flag as a part of the TFCI signaling according to a preferred embodiment of the present invention.

FIG. 5 depicts the remaining data flag as a part of the TFCI signaling according to an embodiment of the present invention. The 'remaining data' flag (or field) has been illustrated as separate signaling in the illustrations above. Although this is one possibility, viewing the flag/field as part of the TFCI signaling is preferable. Autonomous repetitions are typically only useful at the lowest data rates. Hence, viewing the 'remaining data' flag/field as part of the TFCI can reduce the total number of bits necessary as illustrated in FIG. 5.

In general, the retransmissions, regardless of whether they are autonomous or not, can use any well-known scheme for hybrid ARQ with soft combining, e.g., Chase combining or Incremental Redundancy. Furthermore, there are no particular assumptions on the code rates used and the values given, e.g., for the TTI, should be viewed as examples only. Finally, although the principle is described in a cellular uplink scenario, it could in principle be applied in the downlink as well.

Figure 6:
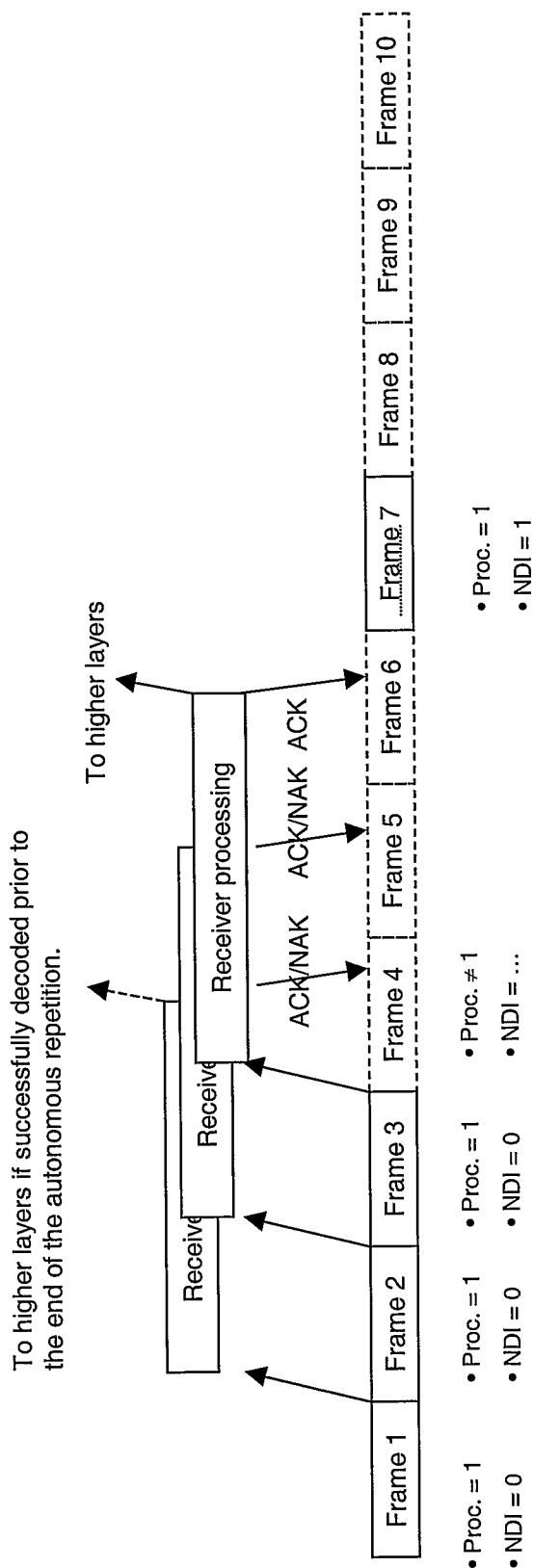
FIG. 6 illustrates a block diagram of an ACK/NAK signal indicating whether the data can be decoded from the (re) transmissions received at the time the ACK/NAK signal is transmitted, according to a preferred embodiment of the present invention.

FIG. 6 illustrates a block diagram of an ACK/NAK signal indicating whether the data can be decoded from the (re) transmissions received at the time the ACK/NAK signal is transmitted, according to a preferred embodiment of the present invention. In the above described embodiments, the transmission of the ACK/NAK signal is done at the end of the decoding process and the ACK/NAK indications as shown in FIGS. 2-4 are marked with dashed lines. A question mark indicates that the ACK/NAK is ignored by the receiver (or not transmitted at all). However, the performance of the above schemes could be further enhanced if these ACK/NAK indicators are used, i.e., the transmitted feedback signal for each frame is cumulative. For each frame, the transmitted ACK/NAK indicates whether the data can be decoded. If only a single decoder is available, the decoding of the previous frame has to be interrupted (unless the decoding is already complete) and an ACK/NAK generated, indicating whether the data at the time of interruption could be decoded or not. Another possibility is that the decoding of data is not interrupted when an autonomous retransmission is detected; instead, the decoding is continued as illustrated. When an autonomous retransmission is detected, this retransmission is soft combined with the previously received data and the combined data is decoded in a separate decoding process.

For example, the smallest possible data unit=320 bit, and with a 2 ms TTI, the minimum data rate is 160 kbit/s. Assuming the required DPCCH power offset relative to the DPCCH is X. If the terminal cannot afford a power offset of X due to power limitations, the terminal can decide to transmit the same data unit (320 bits in this example) with a power offset of X/2 in one TTI and then autonomously retransmit the data unit in the next TTI (with power offset X/2). The overall result is 320 bits transmitted in 2+2=4 ms which is an 80 kbit/s data rate with a power requirement of X/2 dB (relative to the DPCCH). Note also that there may be additional reasons for autonomous retransmissions. As mentioned above, the network may need to limit the terminal data rate (power offset)

due to interference reasons. Hence, even though the terminal could afford the high data rate, it may not be allowed to use it due to network constraints.

When determining if a retransmission is needed, the transmitter may consider all received feedback signals and make a decision to increase the robustness against errors in the feedback signal. As an example the receiver could consider each received feedback signal after the first received ACK (the first few feedback signals are likely always NAKs) and either make a decision according to the ratio of ACK/NAKs received or make a decision based on soft information from the received feedback signals. Another example is that the transmitter could consider the last 'k' received feedback signals and take a joint decision from them.

The invention claimed is:

1. A method for application layer delivery of received packets in a wireless telecommunications system utilizing hybrid Automatic Repeat Request (ARQ) and comprising at least one user equipment (UE) and at least one Base Transceiver Station (BTS) wherein the UE is in communication with the BTS, the method comprising:
   receiving a first frame comprising a data unit, from the UE into the BTS;
   receiving subsequent frames before an acknowledge message has been received in the UE, each subsequent frame comprising a repeat of the data unit in the first frame, from the UE into the BTS; and
   initiating a decoding process in the BTS after receiving the frame(s), wherein the decoding process is commenced according to a precondition,
   wherein receiving a repeated frame combines the data unit from the last received frame(s) with the data units of the other received frame(s), and
   wherein the precondition comprises the BTS receiving a remaining data flag, set to a first value, all but a last frame indicating that each frame is an autonomous transmission and in the last frame the remaining data flag, set to a second value, indicating no further autonomous transmissions, is received by the BTS.

2. The method of claim 1, wherein the step of receiving a first frame is followed by the BTS initiating decoding on the first frame.

3. The method of claim 1, further characterized by determining whether the precondition has been met and if so,
   initiating a decoding process of the combined data units from the received frames.

4. The method of claim 1, further comprising the UE determining that power available to the UE is insufficient to support a high data rate.

5. The method of claim 3, wherein the precondition comprises
   the hybrid ARQ process of the current frame is different from the hybrid ARQ process of the preceding frame.

6. The method of claim 5, wherein the BTS sends an ACK/NAK signal indicating the outcome of the decoding process to the UE.

7. The method of claim 1, wherein the precondition further comprises upon receiving the remaining data flag set to said second value, the receiving BTS begins decoding the data units accumulated from the first to last frames and an ACK/NAK signal is sent to the UE.

8. The method of claim 1, further comprising sending a signal to the UE restricting the use of high data rates.

9. A base transceiver station (BTS) in a wireless telecommunications system, comprising means for application layer delivery of received packets in a wireless telecommunications system that utilizes hybrid Automatic Repeat Request (ARQ) and the system comprising at least one user equipment (UE) and the BTS wherein the UE is in communication with the BTS, and the BTS comprises:
   a receiver for:
      receiving a first frame comprising a data unit, from the UE into the BTS;
      receiving subsequent frames, each subsequent frame comprising a repeat of the data unit in the first frame, from the UE into the BTS; and
      combining means for soft combining the data units received in the first and subsequent frames; and
   a decoder for decoding the soft combined data units, wherein the decoding process is commenced according to a precondition,
   wherein the precondition comprises the BTS receiving a remaining data flag, set to a first value, all but a last frame indicating that each frame is an autonomous transmission and in the last frame the remaining data flag, set to a second value, indicating no further autonomous transmissions, is received by the BTS.

10. The BTS of claim 9, wherein the decoder begins decoding the first frame upon receipt of the first frame.

11. The BTS of claim 10, wherein the decoder aborts decoding the first frame upon receiving a second frame containing the same data unit of the first frame and combines the data units of the first and second frames.

12. The BTS of claim 9, further comprising:
   means for determining whether the precondition has been met and if so,
   means for initiating a decoding process of the combined data units from the first and subsequent frames.

13. The BTS of claim 12, wherein the BTS sends an ACK/NAK signal, indicating the outcome of the decoding process.

14. The BTS of claim 9, wherein upon receiving the remaining data flag set to said second value, the receiving BTS begins decoding the soft combined data units accumulated from the first to the last frames and the BTS sends an ACK/NAK to the UE.

15. The BTS of claim 9, further comprising means for sending a signal to the UE restricting the use of high data rates.

16. A user equipment (UE) device operable in a wireless telecommunication system utilizing hybrid Automatic Repeat Request (ARQ) and comprising at least the UE device and at least one Base Transceiver Station (BTS) wherein the UE device is in communication with the BTS, the UE comprising:
   transmitting means for:
      transmitting a first frame comprising a data unit, from the UE into the BTS;
      transmitting subsequent frames comprising a repeat of the data unit in the first frame, from the UE into the BTS;
      transmitting a last frame comprising a repeat of the data unit in the first and subsequent frames wherein the last frame includes a notice to the BTS identifying the last frame; and
   receiving means for:
   receiving and accepting an ACK/NAK signal from the BTS indicating that the BTS has received the notice and determined that a precondition regarding the received transmissions has been met;
   ignoring an ACK/NAK signal in response to the BTS receiving the first frame; and
   ignoring any ACK/NAK signal received from the BTS in response to the BTS receiving subsequent frames transmitted by the UE.

17. The UE device of claim 16, wherein the precondition comprises
    means for transmitting a last frame with a different hybrid ARQ process from the hybrid ARQ process of the preceding frame and accepting an ACK/NAK signal in response to receipt of the different hybrid ARQ process.

18. The UE device of claim 16, wherein the UE device then accepts an ACK/NAK signal to the UE in response to receipt of the different hybrid ARQ from the BTS indicating the precondition has been met.

19. The UE device of claim 16, wherein the precondition comprises
    means for setting a 'remaining data' flag to a first value, in all but a last frame indicating that each frame is an autonomous transmission and in the last frame the UE transmits a remaining data flag set to a second value indicating no further autonomous transmissions.

20. The UE device of claim 19, further comprising whereupon after transmitting the remaining data flag, now set to said second value, a responding ACK/NAK signal is accepted by the UE indicating that the precondition has been met.

21. The UE device of claim 16, wherein the precondition comprises
    means for setting a remaining transmissions field that is included in all frames and indicates the number of additional autonomous retransmissions to follow the first frame transmission.

22. The UE device of claim 21, wherein the precondition further comprises setting the remaining transmissions field a second frame to one less than that in the first frame.

23. The UE device of claim 22, wherein the precondition further comprises setting the remaining transmissions field in the last frame to zero indicating that the decoder should be started after soft combining is complete and an ACK/NAK signal is accepted by the UE indicating that the precondition has been met.

24. The UE device of claim 16, further comprising means for accepting a signal restricting the use of high data rates.

25. The method of claim 1, wherein the precondition depends on control data received from the UE.

26. The method of claim 25, wherein the control data receivedd from the UE is received with each data unit.

27. A method for application layer delivery of packets in a wireless telecommunications system utilizing hybrid Automatic Repeat Request (ARQ) and comprising at least one user equipment (UE) and at least one Base Transceiver Station (BTS) wherein the UE is in communication with the BTS, the method comprising:
    transmitting a first frame comprising a data unit, from the UE to the BTS;
    transmitting subsequent frames comprising a repeat of the data unit in the first frame, from the UE to the BTS;
    transmitting a last frame comprising a repeat of the data unit in the first and subsequent frames wherein the last frame includes a notice to the BTS identifying the last frame;
    receiving and accepting an ACK/NAK signal from the BTS indicating that the BTS has received the notice and determined that a precondition regarding the received transmissions has been met;
    ignoring an ACK/NAK signal in response to the BTS receiving the first frame; and
    ignoring any ACK/NAK signal received from the BTS in response to the BTS receiving subsequent frames transmitted by the UE.

* * * * *